United States Patent
Mathis et al.

(10) Patent No.: US 7,845,351 B2
(45) Date of Patent: Dec. 7, 2010

(54) GERMICIDAL FACE MASK

(75) Inventors: Michael P. Mathis, Marietta, GA (US);
Uyles Woodrow Bowen, Jr., Canton, GA (US); Eric Clayton Steindorf, Roswell, GA (US); Phillip A. Schorr, Atlanta, GA (US); Angela Dobson, Atlanta, GA (US); Ali Yahiaoui, Roswell, GA (US); Douglas R. Hoffman, Greenville, WI (US); David Koenig, Menasha, WI (US); Anthony Steve Spencer, Woodstock, GA (US)

(73) Assignee: Kimberly-Clark Worldwide Inc., Neenah, WI (US)

( * ) Notice: Subject to any disclaimer, the term of this patent is extended or adjusted under 35 U.S.C. 154(b) by 634 days.

(21) Appl. No.: 11/215,986

(22) Filed: Aug. 31, 2005

(65) Prior Publication Data
US 2007/0044801 A1  Mar. 1, 2007

(51) Int. Cl.
*A62B 18/00* (2006.01)
(52) U.S. Cl. .............................. 128/206.21; 128/206.12; 128/206.13; 128/206.28; 128/205.27
(58) Field of Classification Search ............ 128/206.21, 128/206.28, 207.11, 205.27, 206.12, 206.13, 128/206.19
See application file for complete search history.

(56) References Cited

U.S. PATENT DOCUMENTS

| | | | |
|---|---|---|---|
| 3,101,709 A | 8/1963 | Gruenewaelder | |
| 3,338,992 A | 8/1967 | Kinney | |
| 3,341,394 A | 9/1967 | Kinney | |
| 3,502,763 A | 3/1970 | Hartmann | |
| 3,542,615 A | 11/1970 | Dobo et al. | |
| 3,664,335 A | 5/1972 | Boucher et al. | |
| 3,692,618 A | 9/1972 | Dorschner et al. | |
| 3,802,817 A | 4/1974 | Matsuki et al. | |

(Continued)

FOREIGN PATENT DOCUMENTS

GB    2182245 A  *  5/1987

(Continued)

OTHER PUBLICATIONS

Derwent-Acc-No. 2002-503071; Mask for infection prevention of pathogenic microbes, covers mouth and nose, and has filter supported with biguanide group antimicrobial, Derwent abstract for Uenishi et al., JP 2002-65879, Mar. 5, 2002.*

(Continued)

*Primary Examiner*—Steven O Douglas
*Assistant Examiner*—Clinton Ostrup
(74) *Attorney, Agent, or Firm*—Karl V. Sidor; James B. Robinson (57) ABSTRACT

A face mask for reducing the amount of microbes to which a wearer is exposed is provided. The face mask includes a body portion that has an outer layer that has been treated with a germicidal agent in an effective amount. The layer may be a nonwoven fabric like a spunbond, meltblown or coform layer and may be a laminate of such layers. The face mask having such a germicidal treatment can result in a reduction in microbial activity as compared to another face mask, identical but for the germicidal agent.

11 Claims, 3 Drawing Sheets

U.S. PATENT DOCUMENTS

| | | | |
|---|---|---|---|
| 3,849,241 | A | 11/1974 | Butin et al. |
| 3,953,566 | A | 4/1976 | Gore |
| 4,100,324 | A | 7/1978 | Anderson et al. |
| 4,187,390 | A | 2/1980 | Gore |
| 4,215,682 | A | 8/1980 | Kubik et al. |
| 4,340,563 | A | 7/1982 | Appel et al. |
| 4,375,718 | A | 3/1983 | Wadsworth et al. |
| 4,592,815 | A | 6/1986 | Nakao |
| 4,802,473 | A | 2/1989 | Hubbard et al. |
| 4,856,509 | A | 8/1989 | Lemelson |
| 4,874,659 | A | 10/1989 | Ando et al. |
| 4,969,457 | A | 11/1990 | Hubbard et al. |
| 5,020,533 | A | 6/1991 | Hubbard et al. |
| 5,322,061 | A | 6/1994 | Brunson |
| 5,326,841 | A | 7/1994 | Fellman |
| 5,383,450 | A | 1/1995 | Hubbard et al. |
| 5,401,446 | A | 3/1995 | Tsai et al. |
| 5,492,753 | A | 2/1996 | Levy et al. |
| 5,540,976 | A | 7/1996 | Shawver et al. |
| 5,553,608 | A * | 9/1996 | Reese et al. ............ 128/206.24 |
| 5,681,645 | A | 10/1997 | Strack et al. |
| 5,700,742 | A * | 12/1997 | Payne ..................... 442/123 |
| 5,738,861 | A | 4/1998 | Emerson et al. |
| 5,813,398 | A | 9/1998 | Baird et al. |
| 5,817,325 | A * | 10/1998 | Sawan et al. ................ 424/411 |
| 5,817,584 | A * | 10/1998 | Singer et al. ................ 442/345 |
| 6,045,817 | A * | 4/2000 | Ananthapadmanabhan et al. ........................ 424/405 |
| 6,120,784 | A | 9/2000 | Snyder, Jr. |
| 6,180,584 | B1 * | 1/2001 | Sawan et al. ................ 510/382 |
| 6,264,936 | B1 * | 7/2001 | Sawan et al. ............ 424/78.26 |
| 6,458,341 | B1 | 10/2002 | Rozzi et al. |
| 6,484,722 | B2 | 11/2002 | Bostock et al. |
| 6,767,508 | B1 * | 7/2004 | Yahiaoui et al. ............ 442/123 |
| 7,166,563 | B2 * | 1/2007 | Woodhead ................. 510/237 |
| 7,288,264 | B1 * | 10/2007 | Sawan et al. ................ 424/404 |
| 2004/0000313 | A1 * | 1/2004 | Gaynor et al. ......... 128/205.27 |
| 2005/0079379 | A1 | 4/2005 | Wadsworth et al. |
| 2005/0183727 | A1 | 8/2005 | Chou |

FOREIGN PATENT DOCUMENTS

| | | |
|---|---|---|
| GB | 2236056 | 3/1991 |
| JP | 2002-65879 A * | 3/2002 |
| WO | WO 97/23246 | 7/1997 |
| WO | WO 00/41662 | 7/2000 |
| WO | WO 00/71789 | 11/2000 |
| WO | WO 02/94330 | 11/2002 |

OTHER PUBLICATIONS

JP, 2002-065879, A [Full contents]; Machine translation of JP 2002-65879 provided by JPO, Published Mar. 5, 2002, entire document.*
Reitsma et al., Effectiveness of a New Antimicrobial Gauze Dressing as a Bacterial Barrier, Sep. 2001, Tyco Healthcare, entire document.*
Patent Abstracts of Japan, JP 2000288108, Oct. 17, 2000.
ASTM Designation: F1862-00a, "Standard Test Method for Resistance of Medical Face Masks to Penetration by Synthetic Blood (Horizontal Projection of Fixed Volume at a Known Velocity)," Published Aug. 2000, pp. 1-9.
ASTM Designation: F 2101-01, "Standard Test Method for Evaluating the Bacterial Filtration Efficiency (BFE) of Medical Face Mask Materials, Using a Biological Aerosol of *Staphylococcus aureus*," Published Jun. 2001, pp. 1-5.
ASTM Designation: E1054-02, "Standard Test Methods for Evaluation of Inactivators of Antimicrobial Agents," Published Aug. 2002, pp. 1-8.
ASTM Designation: F2299-03, "Standard Test Method for Determining the Initial Efficiency of Materials Used in Medical Face Masks to Penetration by Particulates Using Latex Spheres," Published Sep. 2003, pp. 1-8.

* cited by examiner

GERMICIDAL FACE MASK

Face masks find utility in a variety of medical, industrial and household applications by protecting the wearer from inhaling dust and other harmful airborne contaminates through their mouth or nose. The use of face masks is a recommended practice in the healthcare industry to help prevent the spread of disease. Face masks worn by healthcare providers help reduce infections in patients by filtering the air exhaled from the wearer, thus reducing the number of harmful organisms or other contaminants released into the environment. Additionally, face masks protect the healthcare worker by filtering airborne contaminants and microorganisms from the inhaled air.

The section of the face mask that covers the nose and mouth is typically known as the body portion. The body portion of the mask may be comprised of several layers of material. At least one layer may be composed of a filtration material that prevents the passage of germs and other contaminants therethrough but allows for the passage of air so that the user may comfortably breathe. The porosity of the mask refers to how easily air is drawn through the mask and a more porous mask is, of course, easier to breathe through. The body portion may also contain multiple layers to provide additional functionality for the face mask. Face masks may, for example, include one or more layers of material on either side of the filtration material layer. Further components may be attached to the mask to provide additional functionality.

The recent outbreak of severe acute respiratory syndrome (SARS) has elevated interest in a germicidal mask which will deactivate microbes contacting a face mask so that they are not inhaled by a wearer and so that they are not transferred to another surface by inadvertent contact of the mask on other surfaces or the hands.

SUMMARY

A face mask is provided in that includes a body portion with an outer surface and an inner surface oppositely disposed to the outer surface. The face mask also includes at least one germicidal agent in an effective amount to reduce the number of viable microbes. The germicidal agent(s) may be located on the outermost layer of the face mask. The germicidal agent may also be advantageously located on a tissue which is added to the face mask as an additional layer.

Germicidal agents include chlorhexidine gluconate, citric acid and sodium lauryl sulfate, PHMB and other agents known in the art to be effective.

Repeat use of reference characters in the present specification and drawings is intended to present same or analogous features or elements of the invention.

DETAILED DESCRIPTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges and limits mentioned herein include all ranges located within, and also all values located under or above the prescribed limits. Also, all ranges mentioned herein include all subranges included in the mentioned ranges. For instance, a range from 100-200 also includes ranges from 110-150, 170-190, and 153-162. Further, all limits mentioned herein include all other limits included in the mentioned limit. For example, a limit of up to about 7 also includes a limit of up to about 5, up to about 3, and up to about 4.5.

One exemplary embodiment provides for a face mask 10 that has a body portion 12 with an outer surface 16 and an oppositely disposed inner surface 18.

Figure 1:
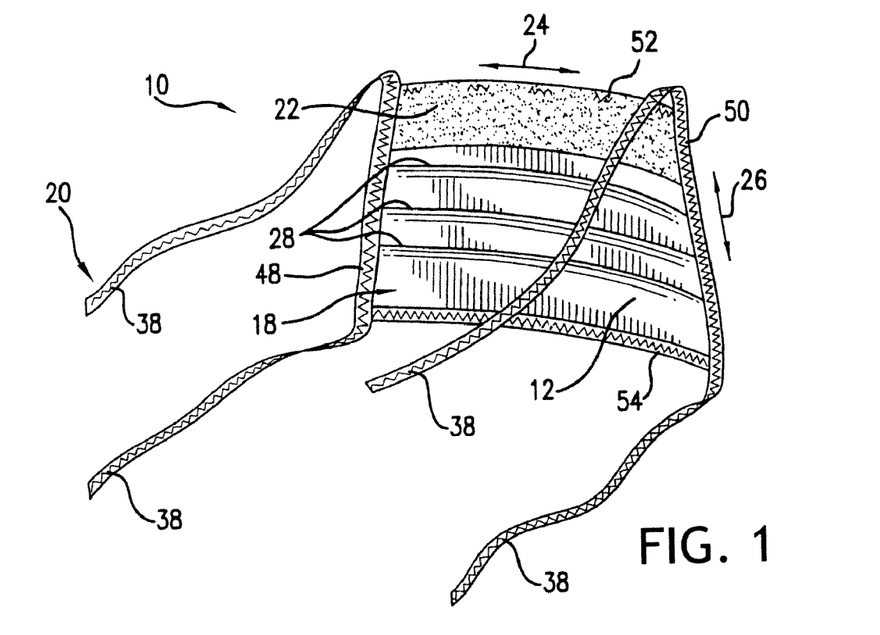
FIG. 1 is a perspective view of a face mask in accordance with one exemplary embodiment that has an absorbent element located on the inner surface.

FIG. 1 is a perspective view of the face mask 10 in accordance with one exemplary embodiment. The face mask 10 includes a body portion 12 that has an inner surface 18 that is configured for facing and contacting the face of a user 14 (FIG. 2) when the face mask 10 is worn. The mask may include a plurality of folds 28 and may also include a malleable member 22. The malleable member 22 is provided so that the top binding 52 of the body 12 can be configured to closely fit the contours of the nose and upper cheeks of the wearer. The malleable member 22 is preferably constructed from a metal strip with a rectangular cross-section, but may be a moldable or a malleable metal or alloy, plastic, or any combination thereof.

Figure 2:
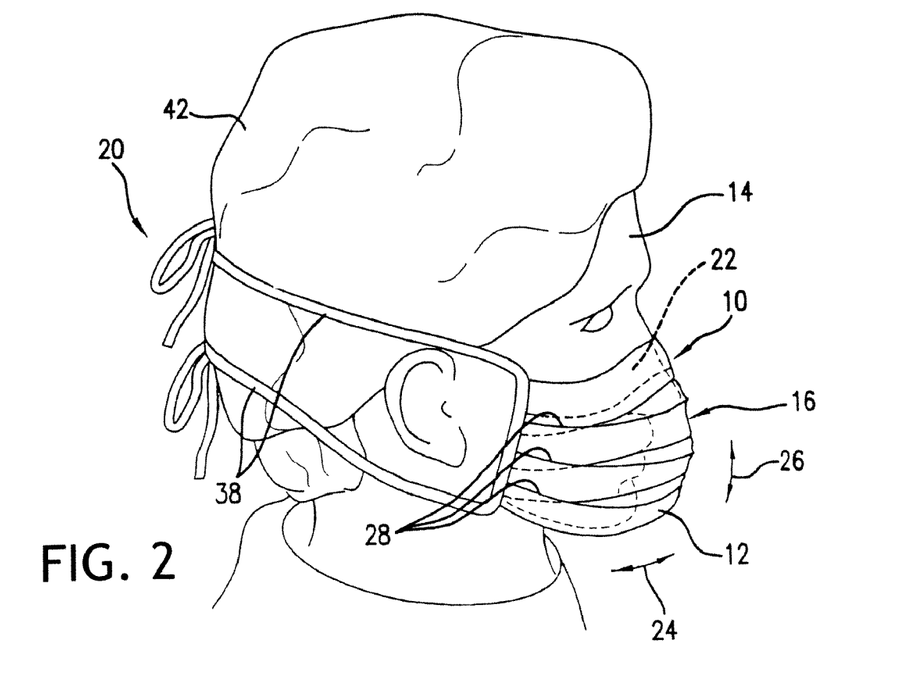
FIG. 2 is a perspective view of the face mask of FIG. 1 shown on a user.

FIG. 2 is a perspective view of the face mask 10 of FIG. 1 shown attached to the face of the user 14. The body portion 12 can be of a variety of styles and geometries, such as, but not limited to, flat half masks, pleated face masks, cone masks, duckbill style masks, trapezoidally shaped masks, etc. The styles shown in the Figures are for illustrative purposes only. The body portion 12 may be configured as that shown in U.S. Pat. No. 6,484,722 to Bostock, et al., the entire contents of which are incorporated by reference herein in their entirety for all purposes. As shown in FIG. 2, the face mask 10 may isolate the mouth and the nose of the user 14 from the environment. The face mask 10 may be attached to the user 14 by a fastening member 20 that may be a pair of manual tie straps 38 that are wrapped around the head of the user 14 (and a hair cap 42 if worn by the user 14) and are connected to one another. It is to be understood, however, that other types of fastening members 20 are employed in accordance with various exemplary embodiments. Instead of the manual tie straps 38, for example, the face mask 10 may be attached to the user 14 by a fastening member 20 that may be ear loops 40 (FIG. 4), elastic bands wrapped around the head of the user 14, a hook and loop type fastener arrangement (e.g. VELCRO® fasteners), or a connection directly attaching the face mask 10 to the hair cap 42.

Additionally, the configuration of the face mask 10 is different in accordance with various exemplary embodiments. In this regard, the face mask 10 can be made in order to cover both the eyes, hair, nose, throat, and mouth of the user 14. As such, the present invention includes face masks 10 that cover areas above and beyond simply the nose and mouth of the user 14. The face mask 10 may also incorporate any combination of known face mask 10 features, such as visors or shields, sealing films, beard covers, etc. Exemplary face masks and features incorporated into face masks are described and shown, for example, in the following U.S. Pat. Nos. 4,802,473; 4,969,457; 5,322,061; 5,383,450; 5,553,608; 5,020,533; and 5,813,398. The entire contents of these patents are incorporated by reference herein in their entirety for all purposes.

The body portion 12 of the face mask 10 may be made of inelastic materials. Alternatively, the material used to construct the body portion 12 may be comprised of elastic materials, allowing for the body portion 12 to be stretched over the nose, mouth, and/or face of the user 14. (FIG. 2) The face mask 10 of the present invention may be made of an elastic material that allows the face mask 10 to stretch in one or more directions. The use of an elastic material incorporated into the body portion 12 may allow for fuller coverage of the user's 14 face and provide for more flexibility in accommodating variously sized faces of the users 14. Alternatively, the body portion 12 may be made of an inelastic material. As such, the material that makes up the face mask 10 may exhibit elastic or inelastic characteristics depending upon the user's 14 needs.

The body portion 12 of the face mask 10 may be configured so that it is capable of stretching across the face of the user 14 (FIG. 2) from ear to ear and/or nose to chin. The ability of the body portion 12 to stretch and recover may provide the face mask 10 with better sealing capabilities and a more comfortable fit than face masks 10 that have an inelastic body portion 12. In order for the body portion 12 to stretch and recover, the body portion 12 may have at least one layer or a material that has stretch and recovery properties. Additionally, the entire face mask 10 may be composed of a material that has stretch and recovery properties in other exemplary embodiments. In certain exemplary embodiments, the percent recovery is about 15% and the percent stretch is between about 15-65%, in other embodiments the percent recovery is between about 20-40% stretch, and in still other embodiments the percent recovery is between about 25-30% stretch.

Figure 3:
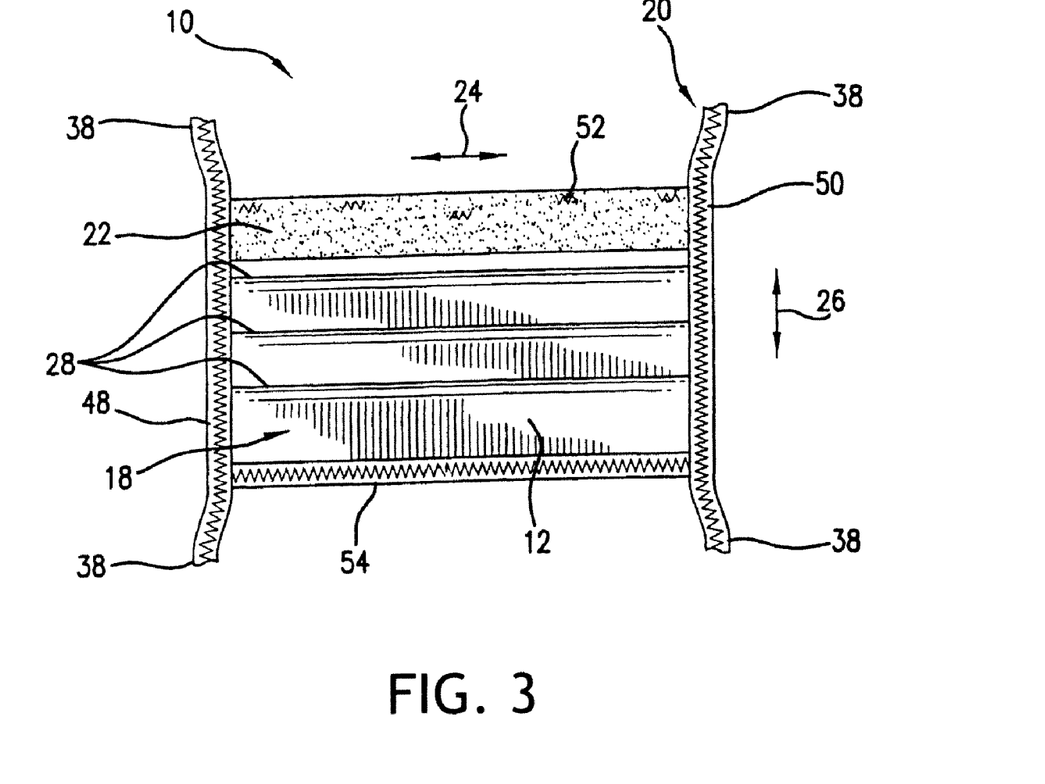
FIG. 3 is a back view of the face mask of FIG. 1.

FIG. 3 shows the inner surface 18 of the body portion 12 of an exemplary embodiment of the face mask 10. The body portion 12 is typically provided with a plurality of folds 28 that extend across the horizontal length 24. The folds 28 may be opened by the user 14 so as to adjust the size of the body portion 12 in the vertical length 26. The folds 28 allow for adjustment of the body portion 12 so as to allow for a better fit on the face of the user 14 and formation of a breathing chamber. The body portion 12 may form a breathing chamber with the perimeter of the chamber sealing to the face of the user 14 in certain exemplary embodiment. Although shown as extending across the entire horizontal length 24, the folds 28 may extend only part way across the body portion 12. Additionally, the folds 28 may be provided in any number and may be oriented at any angle on the body portion 12. For instance, the folds 28 may run at a 45° angle to the horizontal length 24. Alternatively or additionally, the folds 28 may run along the vertical length 26 of the body portion 12. It is to be understood, however, that folds 28 are not required to be present in the practice of the invention and are merely shown for illustrative purposes.

Bindings (FIGS. 1 and 3) 48 and 50 may act to limit the vertical extension of the edges of the body portion 12 when the folds 28 are unfolded. As such, bindings 48 and 50 may be present in order to help provide for a desired shape of the body portion 12. Additionally, bindings 52 and 54 may also act to limit extension of the edges of the body portion 12 when folds 28 are unfolded. This may also be the case if folds 28 are provided in orientations along both the horizontal and vertical lengths 24 and 26 of the body portion 12. As such, bindings 52 and 54 may also be employed in order to achieve a desired shape of the body portion 12.

The folds 28 in the body portion 12 may be of any type commonly known to those having ordinary skill in the art. FIG. 3 shows bindings 48 and 50 on either side of the body portion 12 used in order to constrain unfolding of the folds 28. Additionally, binding 52 may be located on the top edge of the body portion 12 and binding 54 may be located on the bottom edge of the body portion 12. The bindings 48, 50, 52 and 54 may be of any type commonly known to one having ordinary skill in the art.

Figure 4:
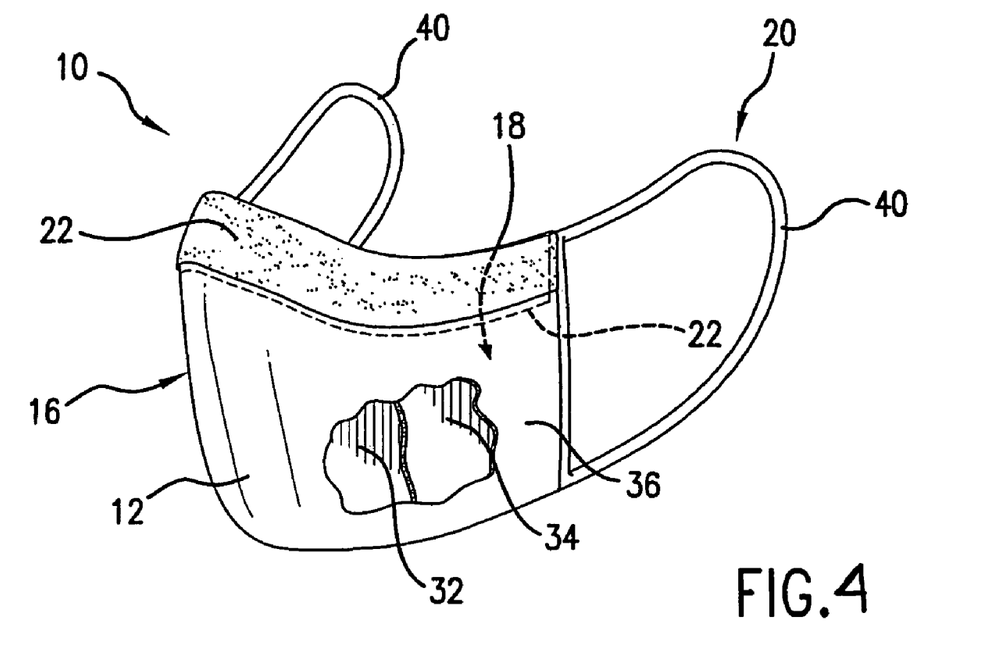
FIG. 4 is a cutaway view of the body portion showing the mask as being made of a plurality of layers.

In FIG. 4, the body portion 12 is shown as being made of a plurality of layers 32, 34 and 36. Layer 32 may be an inner layer of the body portion 12 and have the inner surface 18 defined thereon. Layer 36 may be a protective, on-filtration outer layer of the body portion 12 and have the outer surface 16 defined thereon. Further, layer 34 may be an intermediate layer located between the layers 32 and 36. It is to be understood, however, that the body portion 12 may be made of any number of layers in accordance with the teachings herein. For instance, the body portion 12 can be made of a single layer in accordance with one exemplary embodiment. Alternatively, the body portion 12 can be made of three layers, five layers, seven layers, ten or fifteen layers in accordance with various embodiments.

The intermediate layer 34, as shown in FIG. 4, may be a filtration media configured to prevent the passage of pathogens through the body portion 12 while still allowing for the passage of air in order to permit the user 14 (FIG. 2) to breath.

The layers 32, 34 and 36 may be constructed from various materials known to those skilled in the art. Layer 36 of the body portion 12 protects the inner filtration medium from physical damage and may be any nonwoven web, such as a spunbonded, meltblown, or coform nonwoven web, a bonded carded web, or a wetlaid polyester web or wetlaid composite provided it does not function as a filter. The layer 36 of the body portion 12 and layer 32 may be a necked nonwoven web or a reversibly necked nonwoven web. The layers 32, 34 and 36 may be made of the same material or of different materials. A tissue layer (not shown) may be located subjacent the outer most layer of the face mask.

Many polyolefins are available for nonwoven web production, for example polyethylenes such as Dow Chemical's ASPUN® 6811A linear polyethylene, 2553 LLDPE and 25355, and 12350 polyethylene are such suitable polymers. Fiber forming polypropylenes include, for example, Exxon Chemical Company's ESCORENE® PD 3445 polypropylene and Basell's PF-304. Many other suitable polyolefins are commercially available as are known to those having ordinary skill in the art. Other thermoplastic resins can also be used and include polyester, nylon, polylactic acid, polyglycolic acid and copolymers thereof, fluorinated thermoplastic resins such as inherently fluorinated polyethylene-co-polypropylene (FEP), polyvinylidene fluoride (PVDF) and the like.

The various materials used in construction of the face mask 10 may include a necked nonwoven web, a reversibly necked nonwoven material, a neck bonded laminate, and elastic materials such as an elastic coform material, an elastic meltblown nonwoven web, a plurality of elastic filaments, an elastic film, or a combination thereof. Such elastic materials have been incorporated into composites, for example, in U.S. Pat. No. 5,681,645 to Strack et al., U.S. Pat. No. 5,493,753 to Levy et al., U.S. Pat. No. 4,100,324 to Anderson et al., and in U.S. Pat. No. 5,540,976 to Shawver et al, the entire contents of these patents are incorporated herein by reference in their entirety for all purposes. In an exemplary embodiment where an elastic film is used on or in the body portion 12, the film may be sufficiently perforated to ensure that the user 14 (FIG. 2) can breathe through the body portion 12 if the face mask 10 is desired to be breathable in this location.

The intermediate layer 34 is configured as a filtration layer and may be a meltblown nonwoven web and, in some embodiments, is electret treated. Electret treatment results in a charge being applied to the intermediate layer 34 that further increases filtration efficiency by drawing particles to be filtered toward the intermediate layer 34 by virtue of their electrical charge. Electret treatment can be carried out by a number of different techniques. One technique is described in U.S. Pat. No. 5,401,446 to Tsai et al., the entire contents of which are incorporated herein by reference in their entirety for all purposes. Other methods of electret treatment are known in the art, such as that described in U.S. Pat. No. 4,215,682 to Kubik et al.; U.S. Pat. No. 4,375,718 to Wadsworth; U.S. Pat. No. 4,592,815 to Nakao; and U.S. Pat. No. 4,874,659 to Ando, the entire contents of these patents are incorporated herein by reference in their entirety for all purposes.

The intermediate layer 34 may be made of an expanded polytetrafluoroethylene (PTFE) membrane, such as those manufactured by W. L. Gore & Associates. A more complete description of the construction and operation of such materials can be found in U.S. Pat. Nos. 3,953,566 and 4,187,390 to Gore, the entire contents of these patents are incorporated herein by reference in their entirety for all purposes. The expanded polytetrafluoroethylene membrane may be incorporated into a multi-layer composite, including, but not limited to, an outer nonwoven web layer 36, an extensible and retractable layer, and an inner layer 32 comprising a nonwoven web.

SMS may be used to comprise the layers 32, 34 and 36. SMS is a material that is made of meltblown fibers between two spunbond layers made of spunbonded fibers. Spunbonded fibers are small diameter fibers which are formed by extruding molten thermoplastic material as filaments from a plurality of fine, usually circular capillaries of a spinneret with the diameter of the extruded filaments then being rapidly reduced to fibers as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al., the entire contents of which are incorporated herein by reference in their entirety for all purposes. Spunbond fibers are generally continuous and have diameters generally greater than about 7 microns, more particularly, between about 10 and about 40 microns. Meltblown fibers are fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin et al., the entire contents of which are incorporated herein by reference in their entirety for all purposes. Meltblown fibers are microfibers which may be continuous or discontinuous with diameters generally less than 10 microns.

Multiple layers of the face mask 10 may be joined by various methods, including adhesive bonding, thermal point bonding, or ultrasonic bonding. Although shown as having three layers 32, 34 and 36, it is to be understood that in other exemplary embodiments of the present invention, that the body portion 12 and/or the entire face mask 10 may be made of any number of layers.

While the germicidal treatment may be applied to all types of face masks, surgical and infection control face masks are particularly useful. Surgical and infection control face masks may have a bacterial filtration efficiency (BFE) of greater than or equal to about 85-90% as measured according to ASTM F2101. More particularly, the mask exhibits a BFE of greater than or equal to about 95%. Still more particularly, the mask possesses a BFE of greater than or equal to about 99%. The face mask may exhibit a differential pressure less than or equal to 8 mm water/cm$^2$ as measured by ASTM F2101 to ensure the respiratory comfort of the product. Desirably, the differential pressure is less than or equal to 5 mm water/cm$^2$ and more desirably less than or equal to 2.5 mm water/cm$^2$. The face mask can have a particle filtration efficiency (PFE) of greater than or equal to about 85-90% as measured by Latex Particle Challenge testing (ASTM F2299). More particularly, the PFE is greater than or equal to 95%. Still more particularly, the PFE is greater than or equal to 99%. The face mask may have a fluid penetration resistance of greater than or equal to about 80 mm Hg against synthetic blood as measured according to ASTM F1862. More particularly, the mask exhibits a fluid penetration resistance of greater than or equal to about 120 mm Hg. Still more particularly, the mask exhibits a fluid penetration resistance of greater than or equal to about 160 mm Hg.

The germicidal agent of the instant invention may be present on the outermost layer of the face mask, not the filtration layer. Locating the germicidal agent on the outermost layer provides the additional benefit of reducing the contact transfer of microbes, in addition to reducing their passage through the mask. Furthermore, the location of the germicidal agent on the outer layer of the mask reduces the possibility that the germicidal agent will pass through the mask and be inhaled by a wearer.

The term germicidal agent as used herein means an antimicrobial agent like chemicals or other substances that either kill (deactivate) or slow the growth of microbes. Among the antimicrobial agents in use today are antibacterial agents (which kill bacteria), antiviral agents (which kill viruses), antifungal agents (which kill fungi), and antiparasitic drugs (which kill parasites). Antimicrobial agents may be surface disinfectants (biocides) and therapeutic drugs (antibiotics).

Some example of useful biocide chemistries include biguanides (such as polyhexamethylene biguanide, chlorohexadine, alexidine, and relevant salts thereof), quaternary ammonium compounds (such as benzalkonium chloride, cetrimide, cetylpyridium chloride, quaternized cellulose and other quaternized polymers), a quaternary ammonium siloxane, a polyquaternary amine; metal-containing species and oxides thereof (either in particle form or incorporated into a support matrix or polymer); halogens, a halogen-releasing agent or halogen-containing polymer, a bromo-compound, a chlorine dioxide, a thiazole, a thiocynate, an isothiazolin, a cyanobutane, a dithiocarbamate, a thione, an alkylsulfosuccinate, an alkyl-amino-alkyl glycine, a dialkyl-dimethyl-phosphonium salt, a cetrimide, hydrogen peroxide, 1-alkyl-1,5-diazapentane, or cetyl pyridinium chloride, stabilized oxidants such as chlorine dioxide, stabilized peroxide (such as urea peroxide, mannitol peroxide), sulfides (such as sodium metabisulfite), bis-phenols (such as triclosan, hexachlorophene), various "naturally occurring" agents such as polyphenols from green or black tea extract, citric acid, chitosan, anatase TiO2, tourmaline, bamboo extract, neem oil; hydrotropes (strong emulsifiers) and chaotropic agents (alkyl polyglycosides) and combinations thereof.

Depending on substrate chemistry (polyolefin vs. cellulosic-based materials) and the method of incorporation into the product (topical vs. grafting), many of the above chemistries could be used alone or in concert to achieve the final claimed product properties of interest.

The germicidal agent is present in the face mask in an effective amount. The term effective amount means that a face mask having the germicidal agent contains a lower level of viable microbes than another face mask, identical but for the germicidal agent, when tested using the same method.

The face mask having the germicidal agent should rapidly inhibit and control the growth of microbes. This means that there should be a reduction in the concentration of a broad spectrum of microorganisms by a magnitude of at least 1 $\log_{10}$ within 30 minutes of contact as measured by the liquid droplet test as described below. More particularly, it should result in a reduction in microbial concentration by a factor of 3 $\log_{10}$ (i.e., reduction by $10^3$ colony forming units per gram of material (CFU/g)) within 30 minutes. Still more particularly, it should result in a reduction in microbial concentration by a factor of 4 $\log_{10}$ or more within 30 minutes. The liquid droplet test, also known as a "quick kill" test, gives an indication of what proportion and how quickly microbes in a liquid contacting the layer treated with a germicidal agent are killed.

A "broad spectrum of microorganisms" includes Gram positive and Gram negative bacteria, including resistant strains thereof, for example methicillan-resistant *Staphylococcus aureus* (MRSA), vancomycin-resistant Enterococci (VRE) and penicillin-resistant *Streptococcus pneumoniae* (PRSP) strains. More particularly, it is includes all bacteria (Gram +, Gram − and acid fast strains) and yeasts such as *Candida albicans*. Still more particularly, it includes all bacteria (Gram +, Gram −, and acid fast), yeasts, and both envelope and naked viruses such as human influenza, rhinovirus, poliovirus, adenovirus, hepatitis, HIV, herpes simplex, SARS, and avian flu.

Microbes used for testing are grown in 25 mL appropriate broth medium for about 24±2 hours at 37±2° C. in a wrist action shaker. The bacterial culture is then transferred by placing about 100 μL aliquot in 25 mL of broth and grown again for about 24±2 hours at 37±2° C. The organisms are then centrifuged and washed three times with phosphate buffered saline (PBS). The organisms are then suspended in PBS to obtain an inoculum of approximately 1×10$^8$ CFU/mL.

The test articles and control swatches are exposed to an ultraviolet light source for about 5-10 minutes per side before testing to assure that the swatches are sanitized prior to inoculation with the bacteria. The test materials are brought into contact with a known population of test bacteria from the inoculum for a specified period of time. A sample is then plated at the end of the exposure time to enumerate the surviving bacteria. The $\log_{10}$ reduction from the control material and the original population is calculated using the following formula:

$$\text{Log}_{10}\text{ Control*}-\text{Log}_{10}\text{ CFU/swatch Test Article}=\text{Log}_{10}\text{ Reduction}$$

*CFU/swatch from control swatches or theoretical CFU/swatch.

After exposing the bacteria to the surface of a treated piece of face mask for a designated amount of time (~10-30 minutes), the substrate is placed in a flask and a buffer solution is added to elute the microorganisms off the substrate prior to plating them to see how many are left alive. This buffer solution contains a chemical to de-activate or "neutralize" the antimicrobial agent to (a) stop the active agent from killing the organisms after the designated time period and (b) to prevent artifacts that may arise from exposing the microorganisms to the antimicrobial in solution rather than solely on the substrate. Because each chemical used as an antimicrobial agent is different (ie: cationic, nonionic, metal, etc), a different neutralizer was likely added in each case to shut off the antimicrobial at the desired end point of the experiment. These neutralizers are pre-screened to make sure that they do not affect the microorganisms and adequately neutralize the biocidal effect of the antimicrobial agent. The neutralizer employed may be selected from a list that is commonly used in the field. These include, non-ionic detergents, Bisulphate, lecithin, leethen broth, thiosulfate, thioglycolate, and pH buffers, Method similar to those described in American Society for Testing and Materials, *Standard Practices for Evaluating Inactivators of Antimicrobial Agents Used in Disinfectant, Sanitizer, Antiseptic, or Preserved Products*, Amer. Soc. Testing Mat. E 1054-91 (1991) can be used.

In the liquid droplet test, microorganisms (6.5-7 $\text{LOG}_{10}$ total) suspended in a buffered-saline solution are placed onto a substrate with or without an antimicrobial coating. The microbial suspension (250 μl for bacteria; 200 μl for viruses) is spread over a 32 cm$^2$ area for 1 minute using a Teflon® spreading device. Following spreading, the substrate is allowed to sit for a specified contact time. Following the contact time, the substrate is placed into an appropriate neutralizer and shaken and vortexed thoroughly. Samples are taken from the neutralizer and plated on appropriate media as noted above to obtain the number of viable microbes recovered. The number of microbes recovered from an untreated substrate is compared to the number recovered from a treated substrate to determine the effectiveness of the antimicrobial coating. This is carried out using bacteria and viruses and the data is shown in Tables 3, 4 and 5.

The aerosol test is similar in purpose to the liquid droplet test but the microbes are delivered in aerosol form. The data is shown in Table 6.

In the aerosol test, a 7.5 cm diameter sample is subjected to an aerosol containing at least 10$^6$ CFU microbes for 2 minutes at an air velocity of 22 feet per minute (670 cm/min) to yield a flow through the sample of 30 liters per minute. After two minutes the number of viable microbes on the sample is determined by placing the sample in a letheen broth, shaking for one minute to remove all microbes, and performing a standard plate count on the assay fluid.

The contact transfer test is a measure of how many living microbes are transferred off of the surface of a contaminated substrate. This gives an indication of the potential for spreading contamination due to inadvertent touching of a treated substrate containing microbes, e.g., a face mask, and subsequent touching of another surface. The face mask having the germicidal agent as taught herein also should prevent or minimize the contact transfer of microbes. This means that it should result in a 1 $\log_{10}$ reduction in the transfer of a broad spectrum of viable microorganisms when contacting another surface as compared to an untreated control item as measured by the contact transfer test outlined below. More particularly, it should result in a reduction in viable microorganisms transfer by a factor of 3 $\log_{10}$. Still more particularly, it should result in a reduction in viable microorganisms transferred by a factor of $\log_{10}$ 4 or greater.

In the contact transfer test, microorganisms (6.5-7 $\log_{10}$ total) suspended in a buffered-saline solution are placed onto a substrate with or without an antimicrobial coating. The microbial suspension (250 μl for bacteria; 200 μl for viruses) is spread over a 32 cm² are for 1 minute using a TEFLON® spreading device. Following spreading, the substrate is allowed to sit for a specified contact time. Following the contact time, the substrate is inverted and placed on porcine skin for 1 minute. While on the skin, a continuous weight of ~75 g is applied evenly to the substrate onto the skin. Following 1 minute on the skin, the substrate is removed, placed in an appropriate neutralizer, and shaken and vortexed thoroughly. Samples are taken from the neutralizer and plated on appropriate media to obtain the number of viable microbes recovered. The number of microbes recovered from an untreated substrate is compared to the number recovered from a treated substrate to determine the effectiveness of the antimicrobial coating. To examine the difference in microbes transferred to the porcine skin from an untreated versus a treated substrate, two 2 mL aliquots of a buffered-extractant solution were placed on the skin where contact was made with the substrate. The skin surface was scraped using a TEFLON® spreading device with each 2 mL aliquot being collected following scraping. The extractant collected from the skin was then analyzed for the number of viable microbes in the same manner as the substrate. Effective reduction in contact transfer was determined by comparing the number of microbes extracted from skin contacted with an untreated substrate versus the number extracted from skin contacted with a treated substrate. The results of contact transfer testing are given in Table 7.

Table 1 summarizes various biocides and processing aids that may be used to treat the face mask. It also lists their common or commercial names and chemical names. Quaternary ammonium compounds are commercially available under the names of Aegis™ AEM 5700 (Dow Corning, Midland, Mich.) and Crodacel QM (Croda, Inc., Parsippany, N.J.). The surfactant alkyl-polyglycosides is available commercially under the name Glucopon 220 UP (Cognis Corp., Ambler, Pa.). Chitosan glycolate is available under the name Hydragen CMF and Hydagen HCMF (Cognis Corp., Cincinnati, Ohio). These components can significantly enhance the efficacy of PHMB. The biocides described herein may be used singly or in combination.

TABLE 1

Table of Active Reagents and Processing Aids

| Reagent | Add-on Level to Substrate (wt. %) | Brand or Common Name | Vendor Name |
|---|---|---|---|
| Polyhexamethylene biguanide (PHMB) | 0.01-20 | Cosmocil CQ | Arch Chemicals, Inc. Norwalk, CT |
| Chitosan glycolate | 0.01-10 | Hydagen HCMF | Cognis Corp., Ambler, PA |
| Octadecylaminodimethyl Trimethoxysilylpropyl Ammonium Chloride | 0.01-10 | AEM 5700 (Aegis) | Dow-Corning, Midland, MI |
| N-Alkyl Polyglycoside | 0.01-10 | Glucopon 220 UP | Cognis Corp., Ambler, PA |
| PG-Hydroxyethylcellulose Cocodimonium Chloride (Quaternary Ammonium CellulosicSalt) | 0.01-10 | Crodacel QM | Croda Inc., Persipanny, NJ |
| Xylitol | 0.01-10 | Xylitol | Sigma-Aldrich, Milwaukee, WI |

TABLE 1-continued

Table of Active Reagents and Processing Aids

| Reagent | Add-on Level to Substrate (wt. %) | Brand or Common Name | Vendor Name |
|---|---|---|---|
| 2-hydroxy-1,2,3-propanetricarboxylic acid | 0.01-10 | Citric Acid | Hach Company Ames, IA |
| Benzenecarboxylic acid | 0.1-2.0 | Benzoic acid | Mallinckrodt Baker, Inc Phillipsburg, NJ |
| 2-hydroxybenzoic acid | 0.01-10 | Salicylic acid | Mallinckrodt Baker, Inc Phillipsburg, NJ |
| Methane-carboxylic acid | 0.01-2.0 | Acetic acid | Sigma-Aldrich St. Louis, MO |
| 1,3-Propanedicarboxylic Acid | 0.01-10 | Glutaric acid | Sigma-Aldrich St. Louis, MO |
| Iodine | 0.05-10 | Iodine | Sigma-Aldrich St. Louis, MO |
| Ethyl Hydroxyethyl cellulose | 0.01-5.0 | Bermocoll EBS 481 FQ ("E481") | Akzo Nobel, Inc., Stamford, CT |
| Polyvinyl pyrrolidone | 0.01-10 | Plasdone K90 | ISP Technologies, Inc., Wayne, NJ |
| Poly(vinyl pyrrolidone-co-vinyl acetate) | 0.01-10 | PVP/VA S-630 | ISP Technologies, Inc., Wayne, NJ |
| Polyvinyl pyrrolidone-Iodine complex | 0.01-10 | PVP-Iodine | ISP Technologies, Inc., Wayne, NJ |
| Guanidine Hydrochloride and Sorbitol | 0.01-5.0 | Nicepole FL | NICCA USA, Inc. Fountain Inn, SC |
| Acrylic Co-Polymer Compound and Isopropyl Alcohol | 0.01-5.0 | Nicepole FE 18U | NICCA U.S.A., Inc. Fountain Inn, SC |
| 25% Copper oxide (CuO, $Cu_2O$) (CAS #1317-39-1), 75% polypropylene (PP) resin | 0.01-20.0 | Cupron* | Cupron, Inc. Greensboro, NC |
| Silver Sodium Hydrogen Zirconium Phosphate | 0.01-20.0 | AlphaSan ® RC 2000* | Milliken Spartanburg, SC |
| Silver Zinc glass (70-100%,) barium sulfate (1-30%), PP resin (10-30%) | 0.01-20.0 | Irgaguard B 7520* | Ciba Specialty Chemicals Corp. Tarrytown, NY |

*Used as internal melt additives. These additives are typically compounded in thermoplastic resins (e.g., polypropylene (PP)) to produce a concentrate which is then dry blended with the virgin resin and co-extruded to produce fibers and webs containing such additives. The additive is generally distributed throughout the bulk of the fiber and enough of the additive is present on the surface of the fiber to provide anti-microbial activity. Concentration of the additive present on the surface of the fiber depends on several factors including additive concentration in the melt relative to the main body of resin or type of resin, processing conditions and thermal history, crystallinity of the resin, and relative thermodynamic compatibility of the resin and the additive. It is understood that the additive must be compatible with thermoplastic resin in the melt for proccesability, and yet it is desirable that the additive be less compatible with the resin at ambient conditions so that the additive migrates to a certain extent to the surface of the thermoplastic fiber. Processing aids such as amorphous compounds can be added to the main resin to ease migration of the additive to the fiber surface. It is also understood that other active ingredients such as PHMB can be compounded and co-extruded in various other thermoplastic resins.

A second active antimicrobial agent may be present and may include a quaternary ammonium compound, a quaternary ammonium siloxane, a polyquaternary amine; metal-containing species and oxides thereof, either in particle form or incorporated into a support matrix or polymer; halogens, a halogen-releasing agent or halogen-containing polymer, a bromo-compound, a chlorine dioxide, a thiazole, a thiocynate, an isothiazolin, a cyanobutane, a dithiocarbamate, a thione, a triclosan, an alkylsulfosuccinate, an alkyl-aminoalkyl glycine, a dialkyl-dimethyl-phosphonium salt, a cetrimide, hydrogen peroxide, 1-alkyl-1,5-diazapentane, or cetyl pyridinium chloride.

Table 2 summarizes a number of examples containing various combinations of the reagents listed in Table 1. Each reagent is presented in terms of weight percent (wt %) of the active ingredients of the formulation. The respective formulations are then diluted in an aqueous solution such that the desired amount of active agents can be applied to a substrate for incorporation into the mask. The individual components are listed using the common or commercial brand name, which should not be construed as limiting the invention to any particular commercial embodiment or formulation. The compositional examples of Table 2 can be used as topical coatings over an organic or inorganic substrate and each is effective in producing about at least a 3 $\log_{10}$ reduction in the colony forming units (CFU/mL)(CFU/g) within about 15-30 minutes. Desirably, the compositions are fast acting to kill microbes within about 10 minutes, and in some cases within 5 minutes.

While PHMB is a constituent of all of the compositions, Examples 1-6 illustrate formulations that contain a mixture of at least two or three other helpful active antimicrobial agents or processing aids. Examples 7-13 show formulations that contain PHMB at a significant level ($\geq$70-75 wt % based on weight of actives). Examples 14-26 contain moderate levels of PHMB. In addition to exhibiting some antimicrobial properties, the quaternary ammonium compounds and surfactants aid in wetting the treated substrate materials. It is suspected that this may help provide a more uniform treatment surface for PHMB on the substrate when used in combination. It is also thought that an enhanced wettability of the material permits the targeted organism to come into better proximity and contact with the active moieties of the antimicrobial agents on the surface of the material. The alcohol may also induce a similar effect on the antimicrobial properties of the material. A material treated with the solution, combining the various agents, can exhibit a greater organisms kill efficacy than with PHMB alone.

Examples 27-31 in Table 2A combine the fact-acting topical compositions with slower acting biocides that are either embedded on the surface of substrates or melt-incorporated with polymer-based nonwoven fibers. The two kinds of antimicrobial formulations work in a complementary fashion. The fast-acting topical antimicrobial compositions provide an acute, rapid response against (i.e., immobilize and kill) any microbes that may contact a antimicrobial-treated substrate, and the slower acting biocides embedded or incorporated on the substrate maintains the level of protection over an extended period of time of at least an additional 6-12 hours, but more commonly about 24 hours.

TABLE 2

Illustrative Examples of Antimicrobial Compositions

| Ingredient | EXAMPLE | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| PHMB | 25% | 20% | 20% | 50% | 50% | 30% | 95% | 90% | 50 | 95% | 90% | 99% | 80% |
| Crodacel QM | 5% | 10% | | 10% | 5% | 10% | 5% | 10% | 50 | | | | |
| Chitosan | | | | | | | | | | | | | |
| CMF | 10% | | 20% | 10% | 20% | 20% | | | | | | | |
| Aegis AEM 5700 | 5% | 10% | | | | | | | | | | | 20% |
| Glucopn 220 UP | 5% | | | | | | | | | 5% | 10% | 1% | |
| Xylitol | 15% | 10% | 20% | 10% | | | | | | | | | |
| Citric Acid | 15% | 30% | 20% | 10% | 25% | 20% | | | | | | | |
| Benzoic acid | | 20% | | | | | | | | | | | |
| PVP | | | | 10% | | | | | | | | | |
| PVP/Iodine | 10% | | | | | 20% | | | | | | | |
| E 481 | | | | | | | | | | | | | |
| Nicepole FC | 10% | | 20% | | | | | | | | | | |

| Ingredient | EXAMPLE | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| PHMB | 50% | 3% | 50% | 13% | 5% | 6% | 29% | 33% | 67% | 43% | 20% | 5% | 20% |
| Crodacel QM | | | | | | | | | | | | | |
| Chitosan | | | | | | | | | | | | | |
| CMF | | | | | | | | | | | | | |
| Aegis AEM 5700 | | | 15% | | | | | | | | | | |
| Glucopon 220 UP | 50% | | 5% | 8% | 20% | | | | | | 10% | 20% | 10% |
| Xylitol | | 97% | 5% | | | | | | | | | | |
| Citric Acid | | | 20% | 79% | 75% | 94% | | | | | 70% | | |
| Benzoic acid | | | 5% | | | | | | | | | 75% | 70% |
| PVP | | | | | | | 71% | | | | | | |
| PVP/Iodine | | | | | | | | | | | | | |
| E 481 | | | | | | | | 67% | | 36% | | | |
| Nicepole FE 18U | | | | | | | | | 33% | 21% | | | |

TABLE 2A

Illustrative Examples of
Compositions that include Topical and
Internal Melt Addition of Biocide Agents

| Ingredient | EXAMPLE | | | |
|---|---|---|---|---|
| | 27 | 28 | 29 | 31 |
| Topical | | | | |
| PHMB | 50% | 20% | 35% | 20% |
| Crodacel QM | 10% | | 5% | |
| Chitosan CMF | 20% | | | |
| Aegis AEM 5700 | | | | |
| Glucopn 220 UP | | | | |
| Xylitol | | | 10% | |
| Citric Acid | | | | |
| Benzoic acid | | | | |
| PVP | | | | |
| PVP/Iodine | | | | |
| E 481 | | | | |
| Nicepole FC | | | | |
| 1-hexanol | | 5% | | 5% |
| Internal | | | | |
| Alphasan RC 2000 | | | 50% | 75% |
| Irgaguard B 7520 | | | | |
| Cupron | 20% | 75% | | |

In certain embodiments the antimicrobial composition includes combinations of biocide active agents that work against both bacteria and viruses. For instance, a composition may include: PHMB+citric acid+benozate+"dispersant" (e.g., Nicepol Fla., Glucopon), such as in Examples 1-6. The compositions have a pH in a range of about 2 to about 5 or 6. Preferred pH ranges are about 2.5-4, or 2.5-3.5, depending on the desired, particular environmental conditions for use. Examples 1, 3, 22, and 23, contain an acrylic co-polymer compound and isopropyl alcohol, which serves as an anti-static agent useful for treating nonwoven fabrics such as those commonly found in medical fabrics. In certain embodiment, germicidal activity can be further enhanced with addition of strong anti-oxidants such as selenium and salt derivatives and the like.

The antimicrobial composition should be odorless to humans. This characteristic is important for face masks and other substrates that come into close proximity of nose.

The substrate tested for the data in Tables 3-8 was a spunbond polypropylene fabric with a basis weight of 0.9 osy (30.5 gsm). In the examples described in Tables 3-8, the spunbond fabrics were treated with various compositions using a saturation treatment technique. As an illustration, the following approach was used to create a substrate treated with the composition described by Example 18 as shown in Table 2. The composition of the active agents in Example 18 consists of 20 wt % PHMB, 75 wt % citric acid, and 20 wt % Glucopon 220 UP. This relative ratio of actives was achieved and diluted with water in the following way. A 500 ml aqueous formulation was prepared containing 2.5 wt % Cosmocil CQ (0.5 wt % PHMB)+7.5 wt % citric acid+2 wt % Glucopon 220 UP+88.0 wt % water. As will be apparent later, this level of dilution was chosen to obtain the desired amount of solids loading on the spunbond web. The aqueous formulation was then thoroughly mixed for about 20 minutes using a lab stirrer (Stirrer RZR 50 from Caframo Ltd., Wiarton, Ontario, Canada). After the aqueous composition (or bath) was mixed and homogenized, it was poured into a Teflon coated or glass pan. Then, typically an 8"×11" hand sheet substrate was immersed into the bath for saturation. After full saturation, the substrate was nipped between two rollers, with one stationary roller and one rotating roller, of a laboratory wringer No. LW-849, Type LW-1 made by Atlas Electrical Device Co., Chicago, Ill. After the sample was nipped and passed through the rollers to remove excess saturant, the wet weight (Ww) is measured immediately using a Mettler PE 360 balance. The saturated and nipped sample was then placed in an oven for drying at about 80° C. for about 30 minutes or until a constant weight was reached. After drying, the weight of the treated and dried sample (Wd) was measured. The amount of treatment on the substrate was measured gravimetrically by first calculating the percent wet pick-up (% WPU) using equation 1, $$\% \text{ WPU} = (Ww - Wd)/Wd) \times 100 \quad \text{(Equation 1)}$$

where,
Ww=Wet weight of saturated sample after nipping
Wd=Dried weight of the treated sample
Then, the percent solids add-on on the sheet was calculated using equation 2 below.

$$\% \text{ Add-on} = \% \text{ WPU} \times \text{bath concentration(wt \%)} \quad \text{(Equation 2)}$$

For example, if the solids concentration in the treatment bath is 3.8 wt % and the calculated % WPU is 100% then the solids add-on on the substrate is 3.8 wt %. Using the formulation described above, the % WPU on 0.9 osy spunbond was approximately 100%, giving a fabric that contained 0.5 wt % PHMB, 7.5 wt % citric acid and 2 wt % Glucopon 200 UP. The antimicrobial properties of this sample are illustrated in Table 5. It was found that a fabric treated in this fashion provided a 3 $\log_{10}$ reduction against Influenza A virus after 30 minutes as measured using the quick kill (liquid droplet) test protocol.

TABLE 3

0.9 osy Spunbond with Treatment - Quick Kill (Liquid droplet) Test (10 min contact)

| Identity | Staphylococcus aureus ATCC 27660 | MRSA ATCC 33591 | Klebsiella pneumoniae ATCC 4352 | Candida albicans ATCC 10231 | Rhinovirus 1A* ATCC VR-1364 | Influenza A* ATCC VR-1469 |
|---|---|---|---|---|---|---|
| 2.0% PHMB | >3.5 | | >4.2 | >2.5 | | |
| 1.0% PHMB | >3.5 | >4.5 | | | 0* | 0.6* |
| 0.40% PHMB | >3.5 | 3.5 | | | | |
| 0.20% PHMB | >3.5 | 3.5 | >4.2 | >2.5 | 0* | 0.7* |
| 0.10% PHMB | >3.5 | 4.5 | >4.2 | >2.5 | 0.4* | 0.7* |

TABLE 3-continued 0.9 osy Spunbond with Treatment - Quick Kill (Liquid droplet) Test (10 min contact)

| Identity | Staphylococcus aureus ATCC 27660 | MRSA ATCC 33591 | Klebsiella pneumoniae ATCC 4352 | Candida albicans ATCC 10231 | Rhinovirus 1A* ATCC VR-1364 | Influenza A* ATCC VR-1469 |
|---|---|---|---|---|---|---|
| 0.50% PHMB + 0.30% Crodacel | >3.5 | 3.5 | >4.2 | >2.5 | | |
| 0.50% PHMB + 0.30% AEGIS | >3.5 | | | | | |
| 0.50% PHMB + 0.50% AEGIS + 0.30% Crodacel QM | >3.5 | | | | | |
| Control Recovery (log) | 6.4 | 7.6 | 6.9 | 5.2 | 4.2* | 3.5* |

*= 30 minute contact time

TABLE 4

Treated 0.9 osy Spunbond - Quick Kill (Liquid droplet) Test
Protocol: Assessment of Rapid Germicidal (Time Kill) Activity, 5% Soil Loading
$Log_{10}$ Reduction; 10 min. Contact at 25° C. using a 25 $cm^2$ Test Swatch, 250 μl Inoculum

| Identity | Staphylococcus aureus ATCC 27660 | MRSA ATCC 33591 | Klebsiella pneumoniae ATCC 4352 | Candida albicans ATCC 10231 | Moraxella cattarhalis ATCC 8176 | VRE ATCC 51299 |
|---|---|---|---|---|---|---|
| 0.20% PHMB | | >4.5* | 5.5* | | 4.4* | 3.1* |
| 0.10% PHMB | 2.9 | | 2.5 | 1.1 | | |
| 0.50% PHMB + 0.30% Crodacel | 3.0 | | | | | |
| 0.50% PHMB + 0.30% AEGIS | 0.4 | | | | | |
| Control Recovery (log) | 6.8 | 7.2 | 7.0 | 5.6 | 7.5 | 7.3 |

*30 minute contact time

TABLE 5

Treated 0.9 osy Spunbond - Quick Kill (Liquid droplet) Test
Protocol: Virucidal Efficacy of Face Mask Substrate with a 5% Soil Load
$Log_{10}$ Reduction; 30 min. Contact at 25° C. using a 25 $cm^2$ Test Swatch, 250 μl Inoculum

| Identity | Rhinovirus 1A* ATCC VR-1364 | Influenza A* ATCC VR-1469 |
|---|---|---|
| 0.20% PHMB + 0.30% Crodacel | 0.7 | 0.9 |
| 0.20% PHMB + 0.30% Glucopon | 0.7 | 0.8 |
| 0.5% PHMB + 2.0% Glucopon + 7.5% Citric acid | | 3.0 |
| Control Recovery (log) | 4.2 | 3.5 |

TABLE 6

Treated 0.9 osy Spunbond - Aerosol Test $Log_{10}$ Reduction; 30 min Contact at 25° C. using a 50 $cm^2$ Test Swatch

| Identity | Staphylococcus aureus ATCC 6538 | PhIX174 Bacteriophage |
|---|---|---|
| 1.0% PHMB Testing Faciltiy | >3.3 Nelson | 1.2 Nelson |
| Control Recovery (log) | 6 | 7 |

TABLE 7

Treated 0.9 osy Spunbond as Outer Facing in Mask Composite - Contact Transfer
Protocol: Microbial Contact Transfer, 5% Soil Loading $Log_{10}$ Reduction; 30 min. Contact at 25° C. using a 25 $cm^2$ Test Swatch, 250 µl Inoculum

| Identity | MRSA ATCC 33591 | VRE ATCC 51299 | Klebsiella pneumoniae ATCC 4352 | Moraxella cattarhalis ATCC 8176 |
|---|---|---|---|---|
| 0.20% PHMB | 5.1* | 4.4* | 5.6* | >5.9* |

As can be seen from the data of Tables 3 through 6, the face mask substrate having the germicidal agent rapidly inhibits and controls the growth of microbes. The data shows that there was a reduction in the concentration of a broad spectrum of microorganisms by a magnitude of at least 1 $log_{10}$ within 30 minutes as measured by the quick kill (liquid droplet) test. More particularly, it resulted in a reduction in microbial concentration by a factor of 3 $log_{10}$ (i.e., reduction by $10^3$ colony forming units per gram of material (CFU/g)) within 30 minutes. Still more particularly, it resulted in a reduction in microbial concentration by a factor of 4 $log_{10}$ or more within 30 minutes. Likewise the face mask composite containing an outer facing material of 0.9 spunbond having the germicidal agent prevented the contact transfer of a broad spectrum of microorganisms. The data shows that there was a reduction in the transfer of viable microorganisms by a magnitude of at least 3 $log_{10}$ as measured by the contact transfer protocol.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A face mask comprising:
a fastening member for attaching a body portion of the face mask to the users; and
a body portion joined to the fastening member and configured to be placed over a mouth and at least part of a nose of a user in such that respiration air is drawn through said body portion,
the body portion comprising a plurality of layers with at least an outermost layer having a germicidal agent comprising polyhexamethylene biguanide, citric acid and N-alkyl polyglycoside and wherein the germicidal agent containing layers of the body portion have a percent solids add-on of polyhexamethylene biguanide between 0.01 and 20 weight percent, a percent solids add-on of citric acid between 0.01 and 10 weight percent; and a percent solids add-on of N-alkyl polyglycoside between 0.01 and 10 weight percent.

2. The face mask as set forth in claim 1, wherein the germicidal agent on the body portion of the face mask further includes at least one additional ingredient selected from quaternary ammonium compounds, quaternary ammonium siloxanes, polyquaternary amines, metal-containing species and oxides thereof, halogens, halogen-releasing agents, halogen-containing polymers, bromo-compounds, chlorine dioxides, thiazoles, thiocynates, isothiazolins, cyanobutanes, dithiocarbamates, thiones, alkylsulfosuccinates, alkyl-amino-alkyl glycines, dialkyl-dimethyl-phosphonium salts, cetrimides, hydrogen peroxide, 1-alkyl-1,5-diazapentane, cetyl pyridinium chloride, stabilized oxidants, stabilized peroxides, sulfides, bis-phenols, polyphenols, chitosan, anatase $TiO_2$, tourmaline, bamboo extract, neem oil, hydrotropes, chaotropic agents and combinations thereof.

3. The face mask as set forth in claim 1, wherein at least the body portion of the face mask is treated with said germicidal agent by the method selected from the group consisting of dipping and squeezing, spraying, ink jet printing and combinations thereof.

4. The face mask as set forth in claim 1, wherein the outermost layer comprises a nonwoven web.

5. The face mask as set forth in claim 4, wherein said nonwoven web is selected from the group consisting of spunbond webs and wet laid polyester webs.

6. The face mask of claim 1 wherein the germicidal agent on the body portion of the face mask further includes an ingredient selected from chitosan glycolate, octadecylaminodimethyl trimethoxysilylpropyl ammonium chloride, PG-hydroxyethylcellulose cocodimonium chloride, xylitol, benzoic acid, salycilic acid, acetic acid, glutaric acid, iodine, ethyl hydroxyethyl cellulose, polyvinyl pyrrolidone, poly(vinyl pyrrolidone-co-vinyl acetate), polyvinyl pyrrolidone-Iodine complex, guanidine hydrochloride and sorbitol, acrylic co-polymer compound and isopropyl alcohol, copper oxide, silver sodium hydrogen zirconium phosphate, silver zinc glass, barium sulfate and combinations thereof.

7. The face mask of claim 1 wherein said mask has a particle filtration efficiency as measured by ASTM F-2299 greater than 85%, a bacteria filtration efficiency as measured by ASTM F-2101 greater than 85%, and a differential pressure drop as measured by ASTM F-2101 less than 8 mm water/square cm.

8. The mask of claim 1 wherein said mask exhibits a 3 $log_{10}$ reduction of microbes on the surface of said mask when said mask is insulted with an innoculum selected from the group consisting of MRSA Staphylococcus aureus (ATCC#33591), VRE Enterococcus faecalis (ATCC#51299), Moraxella catarrhalis (ATCC #8176), Klebsiella pneumoniae (ATCC#4352), Candida albicans (ATCC#10231), Rhinovirus 1A (ATCC# VR-1364), Influenza A (ATCC# VR-1469) within 30 minutes of contact with said mask.

9. The face mask of claim 1 wherein said mask exhibits a 3 $log_{10}$ reduction in contact transfer of an innoculum selected from the group consisting of MRSA Staphylococcus aureus (ATCC#33591), VRE Enterococcus faecalis (ATCC#51299), Moraxella catarrhalis (ATCC #8176), Klebsiella pneumoniae (ATCC#4352), Candida albicans (ATCC#10231), Rhinovirus 1A (ATCC# VR-1364), Influenza A (ATCC# VR-1469) within 30 minutes of contact with said mask.

10. A face mask comprising:
a fastening member for attaching a body portion of the face mask to the users; and
a body portion joined to the fastening member and configured to be placed over a mouth and at least part of a nose of a user in such that respiration air is drawn through said body portion, the body portion comprising a plurality of layers with at least an outermost layer being a polyolefin nonwoven web having a germicidal agent comprising polyhexamethylene biguanide, citric acid and N-alkyl polyglycoside and wherein the germicidal agent containing layers of the body portion have a percent solids add-on of polyhexamethylene biguanide between 0.01 and 20 weight percent, percent solids add-on of citric acid between 0.01 and 10 weight percent; and a percent solids add-on of N-alkyl polyglocoside a between 0.01 and 10 weight percent.

11. The face mask of claim 10, wherein the polyolefin nonwoven web is a spunbonded nonwoven web made from a polyolefin selected from polyethylene and polypropylene.

* * * * *